United States Patent
Wang (10) Patent No.: US 10,663,798 B2
(45) Date of Patent: May 26, 2020

(54) LIQUID CRYSTAL DISPLAY PANEL COMPRISING A LIQUID CRYSTAL PRISM AND A REFLECTIVE PRISM DISPOSED BETWEEN FIRST AND SECOND SUBSTRATES AND DRIVING METHOD THEREOF, AND DISPLAY DEVICE

(71) Applicant: BOE TECHNOLOGY GROUP CO., LTD., Beijing (CN)

(72) Inventor: Haiyan Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 209 days.

(21) Appl. No.: 16/008,853

(22) Filed: Jun. 14, 2018

(65) Prior Publication Data
US 2019/0204708 A1   Jul. 4, 2019

(30) Foreign Application Priority Data

Jan. 2, 2018   (CN) .......................... 2018 1 0002654

(51) Int. Cl.
*G02F 1/13357*   (2006.01)
*G02F 1/29*   (2006.01)
(Continued)

(52) U.S. Cl.
CPC .. *G02F 1/133606* (2013.01); *G02F 1/133512* (2013.01); *G02F 1/133526* (2013.01);
(Continued)

(58) Field of Classification Search
CPC .... G02F 1/29; G02F 2201/08; G02F 2203/30; G02F 2201/34; G02F 2201/123;
(Continued)

(56) References Cited

U.S. PATENT DOCUMENTS 7,522,233 B2   4/2009   Watanabe
2014/0176835 A1*   6/2014   Hayashi ............ G02F 1/133711
349/15

(Continued)

FOREIGN PATENT DOCUMENTS

CN   102629041 A   8/2012
CN   202443185 U   9/2012
(Continued)

OTHER PUBLICATIONS

Chinese Office Action dated Nov. 28, 2019, from application No. 201810002654.6.

*Primary Examiner* — Paul C Lee
(74) *Attorney, Agent, or Firm* — Foley & Lardner LLP (57) ABSTRACT

The current disclosure relates to a liquid crystal display (LCD) panel including but not limited to, a first substrate and a second substrate which are opposite to each other to form a cell, and liquid crystal molecules and a reflective prism disposed between the first and second substrates. The first substrate and/or the second substrate is provided thereon with a control electrode configured to generate an electric field to control the liquid crystal molecules to form a liquid crystal prism. The first substrate is further provided thereon with a first light-blocking layer which has an orthogonal projection on the first substrate staggered with an orthogonal projection of the reflective prism on the first substrate.

20 Claims, 4 Drawing Sheets

(51) Int. Cl.
*G02F 1/1337* (2006.01)
*G02F 1/1335* (2006.01)

(52) U.S. Cl.
CPC .......... *G02F 1/133753* (2013.01); *G02F 1/29* (2013.01); *G02F 2001/133607* (2013.01); *G02F 2001/133757* (2013.01); *G02F 2201/08* (2013.01); *G02F 2201/123* (2013.01); *G02F 2201/34* (2013.01); *G02F 2203/24* (2013.01); *G02F 2203/30* (2013.01)

(58) Field of Classification Search
CPC ..... G02F 2203/24; G02F 2001/133757; G02F 1/133753; G09G 3/3607
See application file for complete search history.

(56) References Cited

U.S. PATENT DOCUMENTS

| | | | | |
|---|---|---|---|---|
| 2015/0146115 | A1* | 5/2015 | Liao | G02B 30/27 349/15 |
| 2017/0059959 | A1* | 3/2017 | Wu | C09K 19/52 |
| 2017/0061838 | A1* | 3/2017 | Shi | G02B 5/30 |
| 2018/0081208 | A1* | 3/2018 | Zhao | G02F 1/137 |

FOREIGN PATENT DOCUMENTS

| | | |
|---|---|---|
| CN | 104969121 A | 10/2015 |
| CN | 106652960 A | 5/2017 |
| CN | 106707608 A | 5/2017 |
| CN | 106773379 A | 5/2017 |
| JP | 2008-015228 A | 1/2008 |

\* cited by examiner

| applying a preset driving voltage to the control electrode to generate a preset electric field, the preset electric field controlling the liquid crystal molecules 23 to deflect by a preset angle to form a liquid crystal prism 230 | — S1 |

| the liquid crystal prism 230 receives and reflects the polarized light from the backlight module to direct the reflected light to the reflective prism 24 and transmitted the light to the first light-blocking layer 211 | — S2 |

| the reflective prism 24 receives and reflects the reflected light to the light emergent side of the LCD panel, and the first light-blocking layer 211 absorbs the transmitted light | — S3 |

LIQUID CRYSTAL DISPLAY PANEL COMPRISING A LIQUID CRYSTAL PRISM AND A REFLECTIVE PRISM DISPOSED BETWEEN FIRST AND SECOND SUBSTRATES AND DRIVING METHOD THEREOF, AND DISPLAY DEVICE

CROSS REFERENCE

The present disclosure claims priority to Chinese Patent Application No. 201810002654.6, filed on Jan. 2, 2018 and titled "LCD Panel and Driving Method thereof, and Display Device", and the entire contents thereof are incorporated herein by reference.

TECHNICAL FIELD

The disclosure relates to the technical field of display, and in particular to a LCD panel and driving method thereof, and a display device.

BACKGROUND

With the development of optical technology and semiconductor technology, flat panel displays represented by liquid crystal displays (LCDs) have taken a dominant position in the display field due to their characteristics such as lightness, thinness, high response speed, high contrast, and good color purity.

Figure 1:
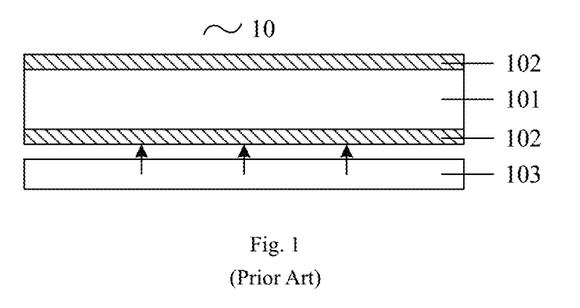
FIG. 1 schematically shows a schematic structural view of a LCD device in the prior art.

FIG. 1 is a schematic structural view of an LCD device 10 in the related art, which may mainly include a LCD panel 101, polarizers 102 attached on opposing sides of the LCD panel 101, and a backlight module 103 positioned at light incident side of the LCD panel 101. In the LCD structure shown in FIG. 1, the presence of the two polarizers causes energy to be greatly absorbed so that a final transmittance is only about 5%, resulting in problems such as high power consumption and low energy utilization of LCD.

It should be noted that the information disclosed in the foregoing background section is only for enhancement of understanding of the background of the present disclosure and therefore may include information that does not constitute prior art already known to those skilled in the art.

SUMMARY

According to some arrangements of the present disclosure, =a LCD panel includes a first substrate and a second substrate which are opposite to each other to form a cell, and liquid crystal molecules and a reflective prism disposed between the substrates. The first substrate and/or the second substrate is provided thereon with a control electrode configured to generate an electric field to control the liquid crystal molecules to form a liquid crystal prism. The first substrate is further provided thereon with a first light-blocking layer which has an orthogonal projection on the first substrate staggered with an orthogonal projection of the reflective prism on the first substrate.

In an exemplary arrangement of the present disclosure, the reflective prism includes a resin prism.

In an exemplary arrangement of the present disclosure, the second substrate is further provided thereon with a second light-blocking layer which has an orthographic projection on the second substrate overlapping an orthogonal projection of the reflective prism on the second substrate.

In an exemplary arrangement of the present disclosure, the control electrode includes a first electrode and a second electrode, at least one of which is a slit electrode.

In an exemplary arrangement of the present disclosure, the first electrode is disposed on the first substrate, and the second electrode is disposed on the second substrate. The second electrode and the second light-blocking layer are disposed in a same layer.

In an exemplary arrangement of the present disclosure, the first substrate further includes a quantum dot layer disposed corresponding to the reflective prism.

In an exemplary arrangement of the present disclosure, the quantum dot layer and the first light-blocking layer are disposed in a same layer.

In an exemplary arrangement of the present disclosure, the first substrate further includes a color filter layer disposed corresponding to the reflective prism.

In an exemplary arrangement of the present disclosure, the color filter layer and the first light-blocking layer are disposed in a same layer.

In an exemplary arrangement of the present disclosure, the LCD panel further includes a scattering layer disposed on a side of the first substrate facing away from the second substrate.

According to some arrangements of the present disclosure, there is provided a display device includes the above LCD panel and a backlight module. The backlight module includes a backlight source and a linear polarizer.

According to some arrangements of the present disclosure, there is provided a driving method of a LCD panel for driving the above LCD panel, the driving method includes applying a preset driving voltage to the control electrode to generate a preset electric field which is configured to control the liquid crystal molecules to deflect by a preset angle to form a liquid crystal prism, receiving and reflecting a polarized light from the backlight module by the liquid crystal prism such that the reflected light is directed toward the reflective prism and the transmitted light is directed toward the first light-blocking layer, and receiving and reflecting the reflected light by the reflective prism to a light emergent side of the LCD panel, and absorbing the transmitted light by the first light-blocking layer.

It is to be understood that both the foregoing general description and the following detailed description are exemplary and explanatory only and are not to limit the disclosure.

BRIEF DESCRIPTION OF THE DRAWINGS

The accompanying drawings herein are incorporated in and constitute part of this specification, illustrate arrangements consistent with the present disclosure, and together with the description serve to explain the principles of the disclosure. Obviously, the drawings in the following description are merely some arrangements of the present disclosure, and based thereon those skilled in the art can also obtain other drawings without any creative effort.

DETAILED DESCRIPTION

Exemplary arrangements will now be described more fully with reference to the accompanying drawings. However, the exemplary arrangements may be implemented in various ways and should not be construed as limited to the examples set forth herein; rather, these arrangements are provided such that this disclosure will be more complete and full, and will fully convey the concept of the exemplary arrangements to those skilled in the art. The described features, structures, or characteristics may be combined in any suitable manner in one or more arrangements. In the following description, numerous specific details are given to provide a thorough understanding of the arrangements of the present disclosure. However, those skilled in the art will recognize that the technical solutions of the present disclosure may be practiced while omitting one or more of the specific details, or other methods, components, devices, steps, etc. may be employed. In other instances, well-known technologies are not shown or described in detail to avoid obscuring aspects of the present disclosure.

Moreover, the drawings are merely schematic illustrations of the present disclosure and are not necessarily drawn to scale. The thickness and shape of each layer in the drawings do not reflect true scale, and are only for the convenience of describing the contents of the present disclosure. The same reference numerals in the drawings denote the same or similar parts, and their repeated description will be omitted.

Figure 2:
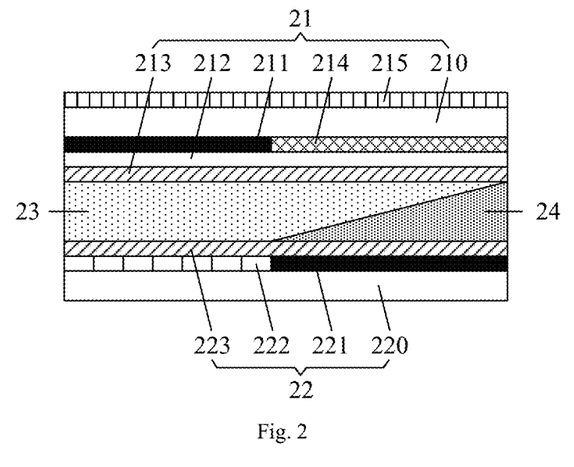
FIG. 2 schematically shows a first schematic structural view of a LCD panel in an exemplary arrangement of the present disclosure.
Figure 3:
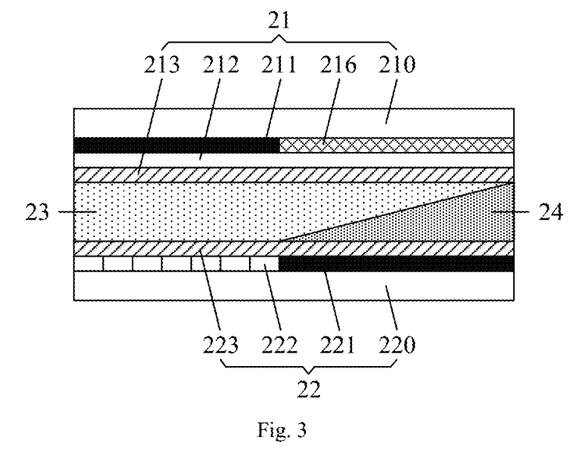
FIG. 3 schematically shows a second schematic structural view of a LCD panel in an exemplary arrangement of the present disclosure.

In an exemplary arrangement, a LCD panel (e.g., as shown in FIG. 2 and FIG. 3) includes a first substrate 21 and a second substrate 22 opposite to each other to form a cell, and liquid crystal molecules 23 and a reflective prism 24 disposed therebetween in a same layer.

Figure 4:
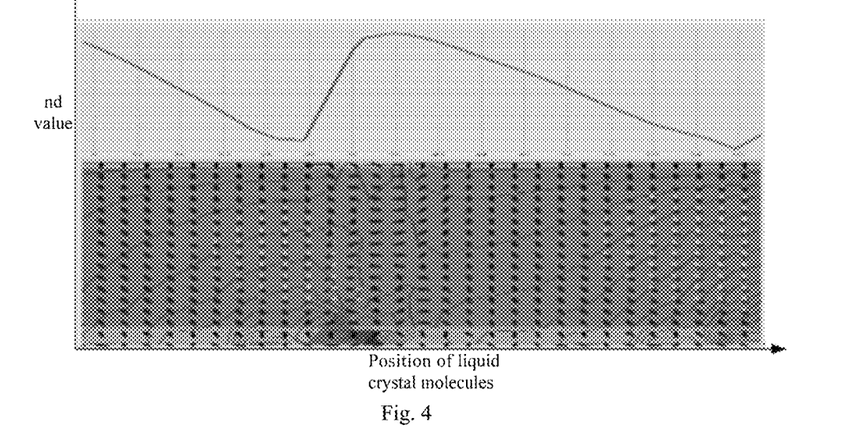
FIG. 4 schematically illustrates a simulation effect of a liquid crystal prism in an exemplary arrangement of the present disclosure.

The first substrate 21 and/or the second substrate 22 is provided thereon with a control electrode which is configured to generate an electric field for driving the liquid crystal molecules 23 to deflect, thereby controlling the liquid crystal molecules 23 to form liquid crystal prisms 230 of different forms. FIG. 4 exemplarily shows an effect simulation view of the liquid crystal prism 230, that is, a delay curve formed by deflection of the liquid crystal; wherein the abscissa represents a coordinate value, i.e., a position coordinate, and the ordinate represents a value of nd at each position, in which n is the refractive index of the liquid crystal molecule, and d is the thickness of the liquid crystal cell. It can be seen therefrom that the effect of the liquid crystal prism 230 with a specific form can be achieved by controlling the liquid crystal molecules 23 at different positions to deflect by different angles.

The first substrate 21 is further provided thereon with a first light-blocking layer 211. The orthogonal projection of the first light-blocking layer 211 on the first substrate 21 and the orthogonal projection of the reflective prism 24 on the first substrate 21 are staggered with each other. In the same sub-pixel, the reflective prism 24 may be used to reflect light to make it exit, while the first light-blocking layer 211 may be used to absorb light so that it cannot exit.

In the LCD panel provided by the exemplary arrangement of the present disclosure, liquid crystal prisms 230 of different forms are formed by controlling the liquid crystal molecules 23 with electric fields generated by controlling the electrodes, and at the same time the reflective prism 24 in the same layer as the liquid crystal molecules 23 is added, such that the polarized light from the backlight module is first reflected by the liquid crystal prism 230 to the reflective prism 24, and then is reflected by the reflective prism 24 to the light emergent side of the LCD panel, thereby realizing the emergence of the light. In this way, by adjusting the voltage applied to the control electrode to control the form of the formed liquid crystal prism 230, a part of the light can be reflected by the liquid crystal prism 230 and directed toward the reflective prism 24, and then reflected to the light emergent side, while another part of the light passes through the liquid crystal prism 230 and is directed toward and finally absorbed by the first light-blocking layer 211, and there is no light to emerge.

Compared with the conventional LCD structure, the LCD panel in this exemplary arrangement not only provides a new gray-level control method, but also by replacing the upper and lower polarizers in the conventional structure by the combination of the liquid crystal prism 230 and the reflective prism 24, significantly improves the light transmittance of the LCD panel and reduces its power consumption. Experiments showed that the light transmittance of such structured LCD panel could be increased from 5% to 20%.

Based on the above structure, referring to FIG. 2 and FIG. 3, the second substrate 22 may be further provided thereon with a second light-blocking layer 221. The orthographic projection of the second light-blocking layer 221 on the second substrate 22 and the orthogonal projection of the reflective prism 24 on the second substrate 22 overlap each other.

In this way, the second light-blocking layer 221 can block the bottom surface of the reflective prism 24 so that the polarized light from the backlight module can only enter the second substrate 22 through an unblocked area, thereby avoiding the light from entering the second substrate 22 through an area corresponding to the reflective prism 24. As such, it is possible to effectively prevent the contrast of a displayed picture from being influenced by incidence of the light at the bottom surface of the reflective prism 24 at the time of dark state display, that is, the gray level of L0.

Both the first light-blocking layer 211 and the second light-blocking layer 221 may be prepared using a BM (Black Matrix) material, which has a good absorption effect for light.

In the present exemplary arrangement, the first substrate 21 may include a first base substrate 210, the second substrate 22 may include a second base substrate 220, and both the first and second base substrates 201 and 220 may be glass substrates or flexible substrates.

In the present exemplary arrangement, the reflective prism 24 may be a resin prism, but it is not limited thereto, and it may alternatively be a glass prism or the like. Since the reflective prism 24 is disposed on the inner side of the second substrate 22, that is, the side close to the liquid crystal molecules 23, in the present arrangement, a resin prism is preferably used as the reflective prism 24 when considering the ease of the fabrication process.

In the sectional views shown in FIGS. 2 and 3, the reflective prism 24 may include a bottom surface and a side surface that are perpendicular to each other, and an inclined surface that faces the liquid crystal molecules 23. The included angle between the inclined surface and the bottom surface of the reflective prism 24 may be set within the range of 0-40°, as long as the light from the liquid crystal prism 230 can be reflected to the light emergent side of the LCD panel and cannot be absorbed by the first light-blocking layer 211. There is no other particular limitation.

In the present exemplary arrangement, the control electrode may include a first electrode 212 and a second electrode 222, at least one of which is a slit electrode, i.e., a plurality of electrically connected strip electrodes.

In one arrangement, the first electrode 212 and the second electrode 222 may be disposed on the same substrate and located in different pattern layers, for example, both are disposed on the second substrate 22 and are disposed in different layers on top of each other. In such a case, one of the electrodes is a slit electrode and the other is a plate electrode, whereby an electric field of ADS (Advanced Dimensional Switching) mode is formed.

In another arrangement, the first electrode 212 and the second electrode 222 may be disposed on the same substrate and located in the same pattern layer, for example, both are disposed on the second substrate 22, and are disposed and spaced in the same layer. In such a case, both of the electrodes are slit electrodes, whereby an electric field of IPS (In-Plane Switching) mode is formed.

In yet another arrangement, the first electrode 212 and the second electrode 222 may be disposed on different substrates. For example, one is disposed on the first substrate 21, and the other is disposed on the second substrate 22. In such a case, one of the electrodes is a slit electrode and the other is a plate electrode, whereby an electric field of the TN (Twisted Nematic) mode is formed.

Figure 5:
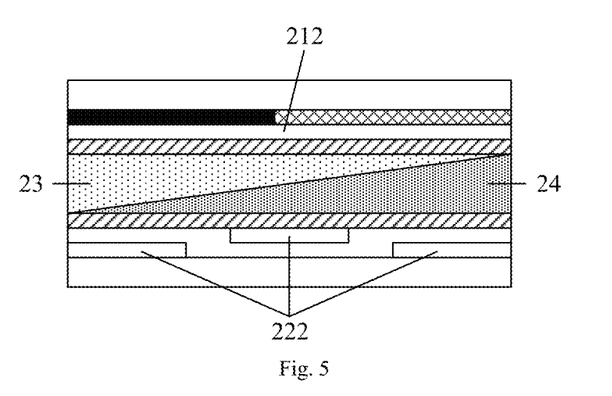
FIG. 5 schematically shows a first schematic view of an electrode structure of a liquid crystal prism in an exemplary arrangement of the present disclosure.
Figure 6:
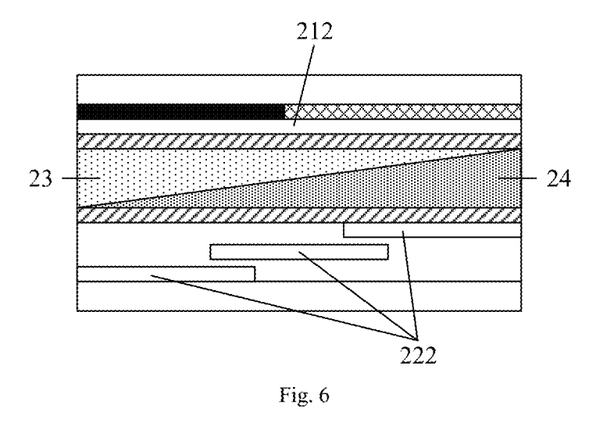
FIG. 6 schematically shows a second schematic view of an electrode structure of a liquid crystal prism in an exemplary arrangement of the present disclosure.

Taking TN mode as an example, FIGS. 5 and 6 respectively show the effect of the liquid crystal prisms 230 formed by different electrode arrangement modes. The first electrode 212 may be a plate electrode and disposed on the first substrate 21, and the second electrode 222 may be a slit electrode and disposed on the second substrate 22. On this basis, since the strip electrodes of the slit electrode cannot be made very thin due to the limitation of the fabrication process, the second electrodes 222 may be configured to be of a double-layer electrode structure in the arrangement shown in FIG. 5, or a three-layer electrode structure in the arrangement shown in FIG. 6, such that the width dimension of the formed liquid crystal prism 230 may be reduced, thereby increasing the bottom angle of the liquid crystal prism 230, and ensuring that a greater degree of deflection of the light can be achieved.

It should be noted that the size of the above strip electrodes has to be designed according to the actual pixel size and the required effect of the liquid crystal prism 230. For example, the minimum process width of the strip electrodes is 1.5 microns, and the minimum gap between the strip electrodes in the same layer is 2 microns.

On this basis, in order to reduce the overall thickness of the LCD panel, the second electrode 222 may be disposed in the same layer as the second light-blocking layer 221; wherein the second light-blocking layer 222 may be opposite to the position of the reflective prism 24, and the second electrode 222 may be staggered with the position of the reflective prism 24.

In the present exemplary arrangement, a first alignment layer 213 may be further disposed on the inner side of the first substrate 21, and a second alignment layer 223 may also be disposed on the inner side of the second substrate 22. The first alignment layer 213 and the second alignment layer 223 may be used to define the initial orientation of the liquid crystal molecules 23.

In an exemplary arrangement, referring to FIG. 2, the first substrate 21 may be an array substrate on which a plurality of thin film transistors may also be arranged in an array to provide the second electrode 222 with a required voltage. The second substrate 22 may be a color film substrate on which a color filter layer 214 may also be disposed to filter lights to form a red light, a green light, and a blue light, respectively.

The position of the color filter layer 214 should be directly opposite to the position of the reflective prism 24 so as to filter the light reflected by the reflective prism 24. In this case, the color filter layer 214 may be disposed in the same layer as the first light-blocking layer 211, thereby facilitating the reduction of the overall thickness of the LCD panel.

On this basis, in order to achieve a wide viewing angle display, the LCD panel may further include a scattering layer 215 disposed on a side of the first substrate 21 facing away from the second substrate 22. The scattering layer 215 can scatter the light emerging from the area of the color filter layer 214 to achieve a wide viewing angle color display.

In an exemplary arrangement, referring to FIG. 3, the first substrate 21 may be an array substrate on which a plurality of thin film transistors may also be arranged in an array to provide the second electrode 222 with a required voltage. The second substrate 22 may be a color film substrate on which a quantum dot layer 216 may also be disposed to emit colored light such as red light, green light or blue light when being excited under a certain electric field or light pressure conditions.

The position of the quantum dot layer 216 should be directly opposite to the position of the reflective prism 24 so as to receive the light reflected by the reflective prism 24 and be excited to emit colored light. In this case, the quantum dot layer 216 may be disposed in the same layer as the first light-blocking layer 211, thereby facilitating the reduction of the overall thickness of the LCD panel.

Figure 7:
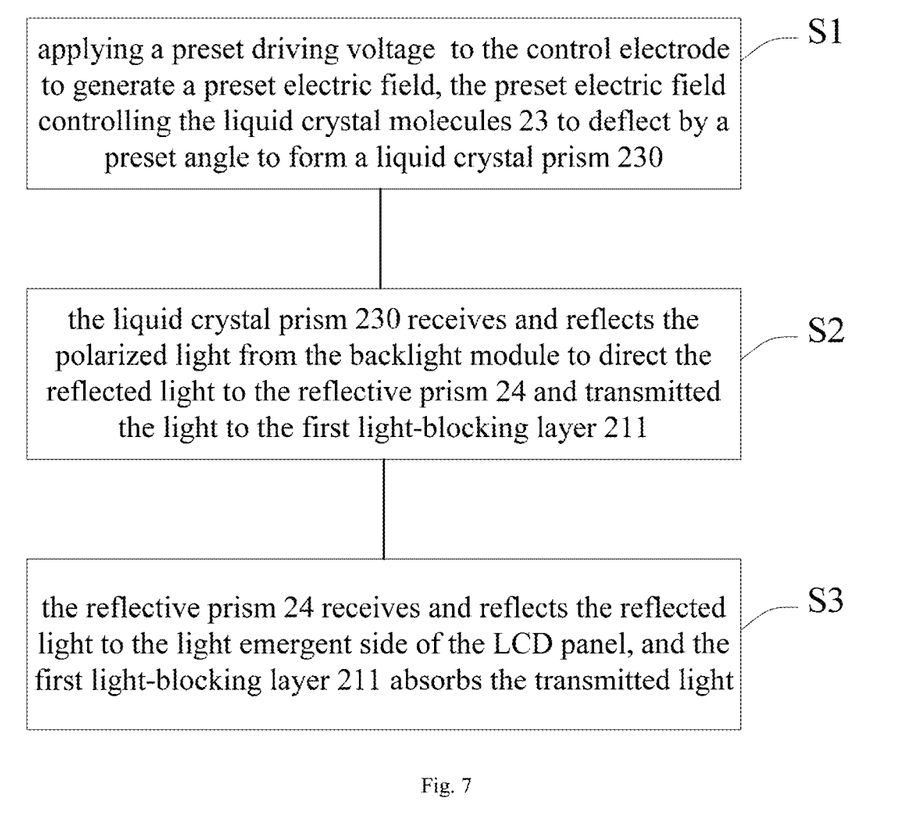
FIG. 7 schematically shows a flowchart of a driving method of a LCD panel in an exemplary arrangement of the present disclosure.

The exemplary arrangement also provides a method for driving a LCD panel, which is used for driving the above-mentioned LCD panel to display images. As shown in FIG. 7, the driving method may include:

S1 that a preset driving voltage is applied to the control electrode to generate a preset electric field, the preset electric field controlling the liquid crystal molecules 23 to deflect by a preset angle to form a liquid crystal prism 230;

S2 that the liquid crystal prism 230 receives and reflects the polarized light from the backlight module to direct the reflected light to the reflective prism 24 and transmitted the light to the first light-blocking layer 211; and S3 that the reflective prism 24 receives and reflects the reflected light to the light emergent side of the LCD panel, and the first light-blocking layer 211 absorbs the transmitted light.

The control electrode may include a first electrode 212 and a second electrode 222. The first electrode may be, for example, a plate electrode, and disposed on the first substrate 21. The second electrode 222 may be, for example, a slit electrode, and disposed on the second substrate 22.

In the driving method of the LCD panel provided by the exemplary arrangement of the present disclosure, the form of the formed liquid crystal prism 230 is controlled by adjusting the preset voltage applied to the control electrode, such that a part of light is reflected in the liquid crystal prism 230 and directed toward the reflective prism 24, and then reflected to the light emergent side. The other part of the light passes through the liquid crystal prism 230 and goes toward the first light-blocking layer 211, and is finally absorbed by the first light-blocking layer 211, and there is no light to emerge. Compared with the conventional LCD, the driving method of the LCD panel in this exemplary arrangement not only provides a new gray-level control method, but also can significantly improve the light transmittance of the LCD panel and reduce its power consumption.

Now an exemplary description will be made to the driving method of the LCD panel in the present exemplary arrangement with reference to FIGS. 8 and 9.

Figure 8:
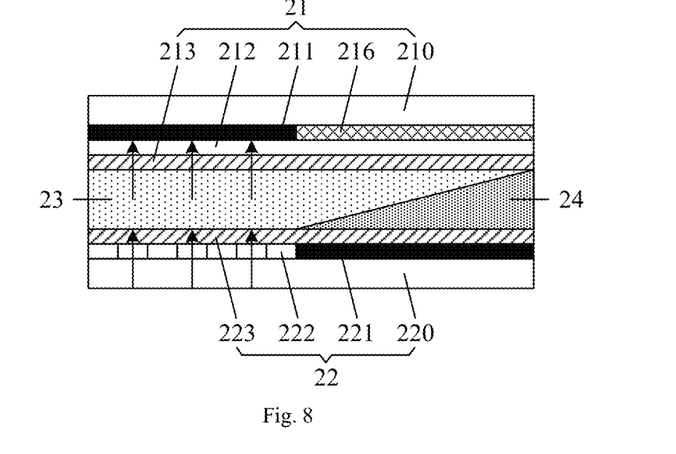
FIG. 8 schematically shows a working principle view for gray level of L0 in an exemplary arrangement of the present disclosure.

FIG. 8 is a schematic view of the operation of the LCD panel under the gray level of L0. When the image of L0 gray level is displayed, a constant voltage may be applied to the first electrode 212, and a zero voltage is applied to the second electrode 222, i.e., no voltage is applied. In this case, the liquid crystal molecules 23 do not form the liquid crystal prism 230, and thus the polarized light from the backlight module will not deflect but goes directly to the first light-blocking layer 211, and is thus absorbed by the first light-blocking layer 211 and there is not light to emerge.

Figure 9:
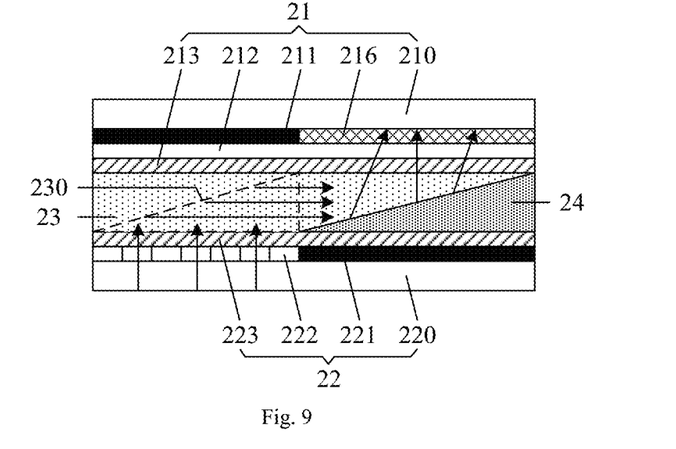
FIG. 9 schematically shows a working principle view fir gray level of L255 in an exemplary arrangement of the present disclosure.

FIG. 9 shows the working principle of the LCD panel under the gray level of L255. When displaying the image of L255 gray level, a constant voltage is still applied to the first electrode 212 and a preset voltage is applied to the second electrode 222. In this case, the liquid crystal prism 230 formed by the liquid crystal molecules 23 has a total reflection angle and thus the polarized light from the backlight module is incident on the liquid crystal prism 230 and totally reflected toward the reflective prism 24, and then is reflected by the reflective prism 24 to the quantum dot layer 216 of the first substrate 21, such that the quantum dot layer 216 is excited to emit colored light such as red light, green light or blue light.

Based on the above principle, when an image having any gray level between L0-L255 is to be displayed, only the preset voltage applied to the second electrode 222 has to be adjusted such that the liquid crystal molecules 23 form liquid crystal prisms 230 of different forms, i.e., different inclination angles, thereby controlling the amount of reflected light to achieve control of the display gray level.

Figure 10:
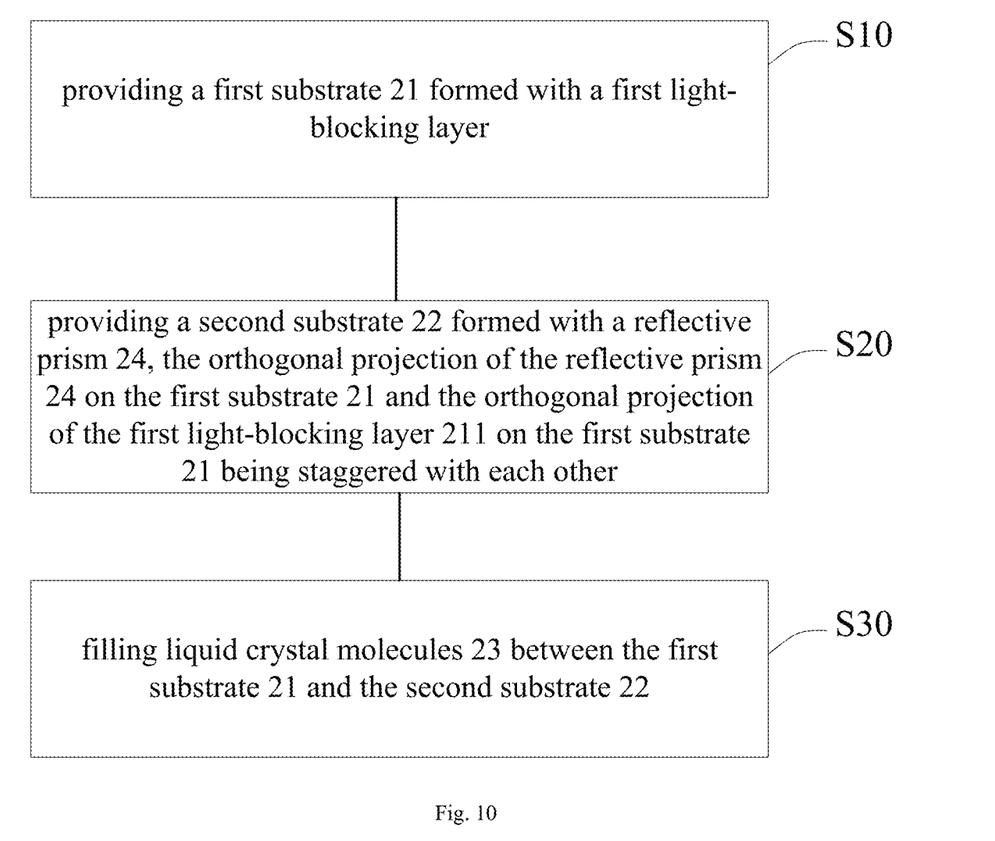
FIG. 10 schematically shows a flow chart of a method of fabricating a LCD panel in an exemplary arrangement of the present disclosure.

The exemplary arrangement also provides a method for fabricating a LCD panel. As shown in FIG. 10, the fabricating method may include:

S10, providing a first substrate 21 formed with a first light-blocking layer 211;

S20, providing a second substrate 22 formed with a reflective prism 24, the orthogonal projection of the reflective prism 24 on the first substrate 21 and the orthogonal projection of the first light-blocking layer 211 on the first substrate 21 being staggered with each other; and S30, filling liquid crystal molecules 23 between the first substrate 21 and the second substrate 22.

Therein, a control electrode is also formed on the first substrate 21 and/or the second substrate 22 for generating an electric field to control the liquid crystal molecules 23 to form the liquid crystal prism 230.

In the method for fabricating a LCD panel provided by the exemplary arrangements of the present disclosure, the liquid crystal molecules 23 are controlled to form liquid crystal prisms 230 of different forms by controlling the electric field generated by the electrodes, and at the same time the reflective prisms 24 in the same layer as the liquid crystal molecules 23 are added, such that the polarized light from the backlight module is first reflected by the liquid crystal prism 230 to the reflective prism 24, and then reflected by the reflective prism 24 to the light emergent side of the LCD panel, thereby realizing emergence of the light. Compared with the conventional LCD structure, the LCD panel in this exemplary arrangement not only provides a new gray-level control method, but also by replacing the upper and lower polarizers in the conventional structure by the combination of the liquid crystal prism 230 and the reflective prism 24, significantly improves the light transmittance of the LCD panel and reduces its power consumption. Experiments showed that the light transmittance of the structured LCD panel could be increased from 5% to 20%.

It should be noted that the specific details of the method for fabricating the LCD panel have been described in detail for LCD panel, and will not be repeated here.

The exemplary arrangement also provides a display device including the above LCD panel and a backlight module.

The backlight module may include a light source, a light guide plate, an optical film, and a linear polarizer and the like. The linear polarizer may be disposed at the light emergent side of the light source to convert the natural light emitted by the light source into linearly polarized light which then enters the light guide plate. Alternatively, the linear polarizer may be disposed at the light emergent side of the backlight module to convert the emergent light of the backlight module into linearly polarized light which is directly incident on the LCD panel.

It should be noted that the backlight module may be a directly-below type backlight module or a side-entry type backlight module, which is not limited in this arrangement.

For example, the display device may include any product or component having a display function, such as a mobile phone, a tablet computer, a television, a notebook computer, a digital photo frame, a navigator, etc., which is not specifically limited in the present disclosure.

Those skilled in the art will readily recognize other arrangements of the present disclosure upon consideration of the specification and practice of the disclosure. This application is intended to cover any variations, uses, or adaptations of the present disclosure which follow the general principles of the present disclosure and include common knowledge or conventional techniques in this technical field not disclosed by the present disclosure. The description and examples are to be considered exemplary only, and the true scope and spirit of the disclosure are defined by the appended claims.

It should be understood that the present disclosure is not limited to the precise structure that has been described above and shown in the drawings, and various modifications and changes may be made without departing from the scope thereof. The scope of the present disclosure is limited only by the appended claims.

What is claimed is:

1. A LCD panel comprising:
   a first substrate and a second substrate opposite to each other to form a cell;

liquid crystal molecules and a reflective prism disposed between the first and second substrates;
at least one of the first substrate and the second substrate is provided thereon with a control electrode configured to generate an electric field to control the liquid crystal molecules to form a liquid crystal prism;
wherein the first substrate is further provided thereon with a first light-blocking layer having an orthogonal projection on the first substrate staggered with an orthogonal projection of the reflective prism on the first substrate.

2. The LCD panel according to claim 1, wherein the second substrate is further provided thereon with a second light-blocking layer having an orthographic projection on the second substrate overlapping an orthogonal projection of the reflective prism on the second substrate.

3. The LCD panel according to claim 1, wherein
the control electrode comprises a first electrode and a second electrode; and
at least one the first electrode and the second electrode is a slit electrode.

4. The LCD panel according to claim 3, wherein
the first electrode is disposed on the first substrate; and
the second electrode is disposed on the second substrate; and
the second electrode and the second light-blocking layer are disposed in a same layer.

5. The LCD panel according to claim 1, wherein
the first substrate further comprises a quantum dot layer disposed corresponding to the reflective prism; and
the quantum dot layer and the first light-blocking layer are disposed in a same layer.

6. The LCD panel according to claim 2, wherein
the first substrate further comprises a quantum dot layer disposed corresponding to the reflective prism; and
the quantum dot layer and the first light-blocking layer are disposed in a same layer.

7. The LCD panel according to claim 3, wherein
the first substrate further comprises a quantum dot layer disposed corresponding to the reflective prism; and
the quantum dot layer and the first light-blocking layer are disposed in a same layer.

8. The LCD panel according to claim 4, wherein
the first substrate further comprises a quantum dot layer disposed corresponding to the reflective prism; and
the quantum dot layer and the first light-blocking layer are disposed in a same layer.

9. The LCD panel according to claim 1, wherein the first substrate further comprises a color filter layer disposed corresponding to the reflective prism.

10. The LCD panel according to claim 2, wherein the first substrate further comprises a color filter layer disposed corresponding to the reflective prism.

11. The LCD panel according to claim 3, wherein the first substrate further comprises a color filter layer disposed corresponding to the reflective prism.

12. The LCD panel according to claim 4, wherein the first substrate further comprises a color filter layer disposed corresponding to the reflective prism.

13. The LCD panel according to claim 9, wherein the color filter layer and the first light-blocking layer are disposed in a same layer.

14. The LCD panel according to claim 9, wherein the LCD panel further comprises a scattering layer disposed on a side of the first substrate facing away from the second substrate.

15. A display device comprising:
a LCD panel comprising:
a first substrate and a second substrate opposite to each other to form a cell;
liquid crystal molecules and a reflective prism disposed between the first and second substrates;
at least one of the first substrate and the second substrate is provided thereon with a control electrode configured to generate an electric field to control the liquid crystal molecules to form a liquid crystal prism;
wherein the first substrate is further provided thereon with a first light-blocking layer having an orthogonal projection on the first substrate staggered with an orthogonal projection of the reflective prism on the first substrate; and
a backlight module, wherein the backlight module comprises a backlight source and a linear polarizer.

16. The display device according to claim 15, wherein the second substrate is further provided thereon with a second light-blocking layer having an orthographic projection on the second substrate overlapping an orthogonal projection of the reflective prism on the second substrate.

17. The display device according to claim 15, wherein the control electrode comprises a first electrode and a second electrode, at least one of the first electrode and the second electrode is a slit electrode.

18. The display device according to claim 17, wherein the first electrode is disposed on the first substrate, and the second electrode is disposed on the second substrate.

19. The display device according to claim 15, wherein the first substrate further comprises a quantum dot layer disposed corresponding to the reflective prism, and wherein the quantum dot layer and the first light-blocking layer are disposed in a same layer.

20. A driving method of a LCD panel, the driving method comprising:
applying a preset driving voltage to a control electrode to generate a preset electric field configured to control liquid crystal molecules to be deflected by a preset angle to form a liquid crystal prism;
receiving and reflecting a polarized light from a backlight module by the liquid crystal prism such that the reflected polarized light is directed toward a reflective prism, and transmitted light is directed toward a first light-blocking layer; and
receiving and reflecting the reflected light by the reflective prism to a light emergent side of the LCD panel, and absorbing the transmitted light by the first light-blocking layer.

* * * * *